(12) United States Patent
Belau et al.

(10) Patent No.: US 12,423,792 B2
(45) Date of Patent: Sep. 23, 2025

(54) SYSTEM AND METHOD FOR DETERMINING AN INDICATOR OF PROCESSING QUALITY OF AN AGRICULTURAL HARVESTED MATERIAL (71) Applicant: CLAAS Selbstfahrende Erntemaschinen GmbH, Harsewinkel (DE)

(72) Inventors: Sven Carsten Belau, Gütersloh (DE); Frédéric Fischer, Arnsberg (DE); Christoph Heitmann, Warendorf (DE); Ingo Bönig, Gütersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 381 days.

(21) Appl. No.: 17/846,278

(22) Filed: Jun. 22, 2022

(65) Prior Publication Data
US 2022/0405912 A1    Dec. 22, 2022

(30) Foreign Application Priority Data

Jun. 22, 2021    (DE) .......................... 102021116117.7

(51) Int. Cl.
*G06V 10/10*    (2022.01)
*A01D 43/08*    (2006.01)
(Continued)

(52) U.S. Cl.
CPC .......... *G06T 7/0004* (2013.01); *A01D 43/081* (2013.01); *A01D 43/085* (2013.01);
(Continued)

(58) Field of Classification Search
CPC ................. G01N 21/33; G01N 21/359; G01N 2021/8592; G01N 2021/3155;
(Continued)

(56) References Cited

U.S. PATENT DOCUMENTS

| | | |
|---|---|---|
| 4,975,863 A | 12/1990 | Sistler et al. |
| 6,751,576 B2 | 6/2004 | Hall et al. |

(Continued)

FOREIGN PATENT DOCUMENTS

| | | |
|---|---|---|
| DE | 102019214038 A1 | 3/2020 |
| EP | 1261920 A1 | 12/2002 |

(Continued)

OTHER PUBLICATIONS

Rasmussen et al., Maize Silage Kernel Fragment Estimation Using Deep Learning-Based Object Recognition in Non-Separated Kernel/Stover RGB Images, 2019, MDPI (Year: 2019).*

(Continued)

*Primary Examiner* — Gregory A Morse
*Assistant Examiner* — Ronde Lee Miller
(74) *Attorney, Agent, or Firm* — Lempia Summerfield Katz LLC (57) ABSTRACT

A method and a system for determining an indicator of processing quality of an agricultural harvested material using a mobile device is disclosed. A computing unit analyzes image data of a prepared sample of harvested material containing grain components and non-grain components in an analytical routine to determine the indicator of the processing quality of the agricultural harvested material. Further, the computing unit uses a trained machine learning model in the analytical routine to perform at least one step of determining the indicator of the processing quality of the agricultural harvested material.

20 Claims, 3 Drawing Sheets

(51) Int. Cl.

| | | |
|---|---|---|
| *G06T 7/00* | (2017.01) | |
| *G06T 7/11* | (2017.01) | |
| *G06T 7/12* | (2017.01) | |
| *G06T 7/60* | (2017.01) | |
| *G06V 10/22* | (2022.01) | |
| *G06V 10/764* | (2022.01) | |
| *G06V 10/776* | (2022.01) | |
| *G06V 10/82* | (2022.01) | |
| *G06V 20/69* | (2022.01) | |
| *G06V 20/70* | (2022.01) | |

(52) U.S. Cl.
CPC ............... *G06T 7/11* (2017.01); *G06T 7/12* (2017.01); *G06T 7/60* (2013.01); *G06V 10/225* (2022.01); *G06V 10/764* (2022.01); *G06V 10/776* (2022.01); *G06V 10/82* (2022.01); *G06V 20/70* (2022.01); *G06T 2207/20021* (2013.01); *G06T 2207/20081* (2013.01); *G06T 2207/20084* (2013.01); *G06T 2207/30128* (2013.01)

(58) Field of Classification Search
CPC ..... G01N 2201/0642; G01N 2201/065; A01D 41/127; A01D 41/1208
See application file for complete search history.

(56) References Cited

U.S. PATENT DOCUMENTS

| | | |
|---|---|---|
| 9,596,734 B2 | 3/2017 | Delnoij et al. |
| 2016/0029561 A1 | 2/2016 | Fischer et al. |
| 2016/0078611 A1 | 3/2016 | Butts et al. |
| 2016/0189007 A1 | 6/2016 | Wellington et al. |
| 2017/0115211 A1 | 4/2017 | Morimoto |
| 2018/0177125 A1 | 6/2018 | Takahara et al. |
| 2019/0059222 A1 | 2/2019 | Kelber |
| 2020/0084966 A1* | 3/2020 | Corban ............... A01D 61/02 |
| 2020/0084967 A1 | 3/2020 | Corban et al. |
| 2020/0128735 A1 | 4/2020 | Bonefas et al. |
| 2020/0281119 A1 | 9/2020 | Sander et al. |
| 2021/0182686 A1* | 6/2021 | Wang ............... G06N 3/084 |
| 2021/0192715 A1 | 6/2021 | Leshem et al. |
| 2021/0400871 A1 | 12/2021 | Fischer et al. |
| 2022/0132736 A1 | 5/2022 | Meyers et al. |
| 2022/0225568 A1* | 7/2022 | Töniges ............... G06T 7/62 |

FOREIGN PATENT DOCUMENTS

| | | |
|---|---|---|
| EP | 2098109 A1 | 9/2009 |
| EP | 3646703 A1 | 5/2020 |
| EP | 2982223 B1 | 11/2020 |

OTHER PUBLICATIONS

Baze, Shannon. "Producing Quality Corn Silage from Proper Processing." Standard Dairy Consultants, Oct. 13, 2022, standard-dairyconsultants.com/producing-quality-corn-silage-from-proper-processing/.*

Kar, Akankshya, et al. "Annotation-free Quality Estimation of Food Grains using Deep Neural Network." BMVC. 2019.

Rasmussen, Christoffer Bøgelund, and Thomas B. Moeslund. "Maize silage kernel fragment estimation using deep earning-based object recognition in non-separated kernel/stover rgb images." Sensors 19.16 (2019): 3506.

Rasmussen, Christoffer Bøgelund, Kristian Kirk, and Thomas B. Moeslund. "Anchor tuning in Faster R-CNN for measuring corn silage physical characteristics." Computers and Electronics in Agriculture 188 (2021): 106344.

European Search Report for European Application No. 221 56924. 7-1207 dated Jul. 28, 2022.

* cited by examiner

SYSTEM AND METHOD FOR DETERMINING AN INDICATOR OF PROCESSING QUALITY OF AN AGRICULTURAL HARVESTED MATERIAL

CROSS REFERENCE TO RELATED APPLICATIONS

This application claims priority under 35 U.S.C. § 119 to German Patent Application No. DE 102021116117.7 filed Jun. 22, 2021, the entire disclosure of which is hereby incorporated by reference herein. This application is related to U.S. application Ser. No. 17/846,273, which is incorporated by reference in its entirety.

TECHNICAL FIELD

The invention relates to a system and method for determining at least one aspect of an agricultural harvested material, such as an indicator of processing quality of the agricultural harvested material.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Forage harvesters harvest a crop from a field and process the agricultural harvested material thus obtained by using a series of work assemblies. One area of application of foraging harvesters is the harvesting of corn. With this type of harvesting, frequently the entire corn plant including the corncob is collected and chopped up using the forage harvester. The agricultural harvested material obtained in this manner may be used to feed livestock, especially ruminants. An alternative possible application is use in biogas plants.

When the agricultural harvested material is used as feed for animals and when used in biogas plants, it is important for the grain components of the agricultural harvested material to be cracked (e.g., comminuted). In cracking, the starch contained within the grain components becomes accessible and is not protected by the husk of the grain component. The cracking of grain components may be accomplished on the one hand by chopping up the agricultural harvested material and on the other hand substantially by a corn cracker of the forage harvester. This corner cracker may be adjusted so that all grain components are reliably comminuted strongly; however, such an adjustment may consume an unnecessary amount of fuel.

Silage Snap App is a method in which an indicator of processing quality of a grain component, particularly corn grains, of an agricultural harvested material is determined with a mobile device, such as a smartphone. In such a method, the corn grains must be washed out of the agricultural harvested material, manually separated from each other and distributed on a known background. Then, a photograph is taken using the mobile device, and an approximation of the corn silage processing score (CSPS) is determined using this photograph.

EP 2 982 223 B1 and EP 3 646 703 A1 disclose methods for analyzing harvested material that are performed by a dedicated camera attached to a forage harvester. U.S. Pat. No. 4,975,863 discloses a method for image analysis of particles in which particles are separated. Finally, EP 1 261 920 A1 discloses a method for analyzing harvested material.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed in the background, in using the Silage Snap App, the corn grains must be washed out of the agricultural harvested material, manually separated from each other, distributed on a known background, photographed, and then analyzed. Even with such manual sorting, the analysis performed (e.g., the regression of the determined processing quality indicator) yields results that may not be optimal. Further, EP 2 982 223 B1 and EP 3 646 703 A1 use dedicated cameras, which may be quite expensive and the analysis methods may be quite involved. U.S. Pat. No. 4,975,863 requires separating the particles in a very involved manner.

Against such a backdrop, there is a need for a more economical, less involved, and/or a more precise system and method for determining an indicator of processing quality of an agricultural harvested material. In one or some embodiments, the disclosed system and method is based on the problem of configuring and developing the known method such that the determination of the indicator of processing quality of an agricultural harvested material is simplified and/or improved.

Thus, in one or some embodiments, a method is disclosed for determining an indicator of processing quality of an agricultural harvested material using a mobile device, such as a smartphone or a tablet, wherein the mobile device has a computing unit and/or communicates with the computing unit. In one embodiment, a prepared sample comprising grain components and non-grain components may be analyzed using a trained machine learning model. In particular, the computing unit (using an analytical routine) is configured to analyze image data of a prepared sample of harvested material containing grain components and non-grain components to determine the indicator of the processing quality of the agricultural harvested material. In this way, the machine learning model may be trained using the prepared sample of the agricultural harvested material. In turn, the computing unit may use the trained machine learning model in the analytical routine to perform at least one step of determining the indicator of the processing quality of the agricultural harvested material. Further, it is noted that any type of agricultural harvested material is contemplated, such as agricultural harvested material obtained with a forage harvester.

The disclosed method may be significantly easier by dispensing with the involved manual removal of the grain components from the sample. In addition, it is possible to also analyze the non-grain components. Moreover, it has been shown that a greater degree of certainty may be achieved in the regression to the CSPS determined in the laboratory by using a trained machine learning model. Thus, the disclosed methodology stands in contrast to manually separating the grain components as with the known prior art of the Silage Snap App.

In one or some embodiments, the grain components are corn, and/or the indicator of the processing quality is an indicator of the processing quality of the corn components. Particularly when chopping corn, the processing quality of the grain components is very important. Thus, the indicator of grain cracking, such as, the indicator of the processing quality, may correlate to the corn silage processing score.

In one or some embodiments, the computing unit may perform a classification step of the image data in the analytical routine, such as by using the trained machine learning model. Accordingly, the classification step may identify those image regions as containing or having assigned thereto the grain components. These image regions identified as containing grain components may then be further analyzed. In one or some embodiments, the computing unit may determine image region(s) containing or having grain components from input data based on the image data (e.g., in the classification step, the computing unit uses the trained machine learning model in order to determine the image regions containing or assigned to the grain components from the image data).

In one or some embodiments, the classification step may be based on a semantic segmentation. The use of a semantic segmentation in the classification step may take into account the fact that grain components are generally not densely distributed over a sample of harvested material so that several grain components rarely overlap. Moreover, the recognition of the grain components depends little on context, which allows a small and efficient machine model to be used. In this regard, the computing unit, in the classification step, may apply the trained machine learning model to the image data and may assign a class to pixels (e.g., all pixels) of the image data (with one example class being assigned to grain components). More particularly, the machine learning model may assign the pixels to a plurality of different classes (e.g., at most 30 different classes, at most eight different classes, precisely three different classes, precisely two different classes, or a class of non-grain components of the agricultural harvested material, or the potential classes of "grain components" and "background", which is an example of a general class of "non-grain components").

In one or some embodiments, considering that the complexity of the disclosed methodology lies in the segmentation and classification, the subsequent analysis may exhaust itself in considering the geometric sizes of the determined image regions. In so doing, the smallest main axis of a minimum surrounding rectangle may be used since, in the straining process to determine the CSPS, this may also be responsible for whether a grain component will fall through the sieve. More specifically, in the analytical step, the computing unit may determine at least one geometric property, such as a size, of the image region, and may determine the indicator of the processing quality from the geometric properties, such as the image regions are a particular shape (e.g., rectangles), or the computing unit may determine the particular shape (e.g., rectangles) from the image regions (e.g., the rectangles are minimum surrounding rectangles) with the geometric property (such as the size) optionally referring to one aspect of the rectangles, such as a length of a smallest main axis of the rectangles. Thus, in attempting to approach the determined laboratory CSPS, this analysis may be advantageous.

In one or some embodiments, given the preferably low-complexity analytical step, it may be provided that it is not based on a machine learning method. In particular, in the analytical step, the computing unit may perform edge recognition to separate the pixels assigned to the classes of "grain components" and "background" and may thereby determine the rectangles.

In one or some embodiments, a preferred determination of the indicator of the processing quality may be analogous to the CSPS. In particular, the computing unit may determine the indicator of the processing quality in the analytical step as the sum of the area of the grain components with a size, such as the length of the smallest main axis of the rectangles, below a threshold as the portion of the overall area of the grain components. Various thresholds are contemplated. Merely by way of example, the threshold may be between 3 mm and 6 mm, may be between 4 mm and 5 mm, and may be about 4.75 mm (e.g., within 5% of 4.75; within 10% of 4.75; etc.).

In one or some embodiments, various architectures of the machine learning model are contemplated. By way of example, a fully convolutional network, such as for semantic segmenting, may be used. Thus, the trained machine learning model may include instructions for use and a training data set, the instructions for use may be based on a convolutional neural network, such as a fully convolution neural network, and/or the training data set (e.g., the training data record) has been or is determined in a training method.

In one or some embodiments, a pre-processing step may be performed. Specifically, by effectively preprocessing the image data, both a simpler machine learning model may be used, and better results may be achieved. In particular, correcting a perspective of an image may be advantageous when considering geometric variables. For example, dividing an image into a plurality of subimages, such as at least two, such as at least four subimages, makes it possible to use a less complex machine learning model for the smaller subimages obtained in this manner. Since, for the present problem, little to no information may be available in a global context, greater efficiency may be easily achieved without a loss of quality. Thus, the computing unit may perform the preprocessing step in order to determine the input data from the image data, with the preprocessing step includes any one, any combination, or all of: rotating an image; correcting a perspective of an image; dividing an image into a plurality of subimages (e.g., at least two subimages; at least four, subimages; etc.); adapting the color of an image; or adapting contrast of an image.

In one or some embodiments, the computing unit has a mobile device computing unit and a server computing unit. Depending on whether the analytical routine is performed on a server or the mobile device, either more complex operations may be performed, or an off-line capability may be achieved. In such a configuration, the server computing unit may at least partially perform the analytical routine, or the computing unit may only have the mobile device computing unit (with the mobile device computing unit completely performing the analytical routine).

In an individual image of a sample of harvested material, there may be relatively few grain components when there is sufficient resolution. Because the agricultural harvested material may be very homogeneous with respect to corn cracking, it is not problematic to combine in the image data several images of different samples of a homogeneous harvested material to be measured. By analyzing several images, greater accuracy may be achieved in statistical terms. Image data have proven to be advantageous in which at least 100 to 200 grain particles are present. As such, the image data may comprise several images, with the user obtaining the one or more images of the image data using the camera on the mobile device (e.g., the user records, using the camera, several images of different prepared samples with the computing unit analyzing in the analytical routine together or in combination the one or more images as image data.

In one or some embodiments, the prepared sample may be a sample on a defined background that may have a size reference and/or a defined color. The geometric dimensions in the form of the size value may be easily determined by using the size reference (e.g., the computing unit determining the geometric property, such as the size, based on the size reference). The defined color may make it easier to separate the foreground and background in the image data.

In one or some embodiments, a training method for generating a training data set of a machine learning model is disclosed. The training data set may be used in the disclosed method. Reference is made to all statements regarding the disclosed method. For example, the computing unit may generate the training data set in a training step using training instructions based on training data, wherein the training data may comprise annotated image data of prepared samples, and/or the computing unit may use a cost function in the training instructions.

In one or some embodiments, the cost function may comprise a dice loss function, and/or takes into account a deviation of the indicator of the processing quality from a reference indicator for the processing quality. Since fewer grain particles per total image area are in the training data, provided they are realistic, good results may be achieved with the dice loss function that ensures that the results of rare classes are taken into account when there are unevenly distributed classes. Since in the present case, however, the focus is less on the correct segmentation of each pixel, and the correct determination of contiguous image regions of approximately the correct size is instead relevant, the cost function may be improved by comparing the deviation of the indicator of the processing quality, calculated on the basis of the particular training status, of a reference indicator of the processing quality. Thus, a deviation of the indicator of the processing quality may be calculated using a current training state of the reference indicator of the processing quality, and may be regularly considered in the cost function by using a callback.

In one or some embodiments, various amounts of trainable parameters of the machine learning model are contemplated. For example, the machine learning model may have at least 4 million trainable parameters, at least 5 million trainable parameters, at least 6 million trainable parameters, at most 15 million trainable parameters, at most 12 million trainable parameters, or at most 9 million trainable parameters.

In one or some embodiments, a storage medium with a training data set saved thereupon that is generated using the disclosed training method is disclosed. Reference is made to all statements regarding the proposed training method.

In one or some embodiments, a computing unit configured to perform the analytical step, and/or the analytical routine, and or the training method is disclosed. Reference is made to all statements regarding the disclosed method and the disclosed training method.

In one or some embodiments, a mobile device configured for use in the disclosed method is disclosed. Reference is made to all statements regarding the proposed method.

Referring to the figures, the disclosed method for determining an indicator I of processing quality of an agricultural harvested material 1 is explained in greater detail with reference to the figures. One embodiment relates to the use in a forage harvester 2. The agricultural harvested material 1 may be chopped plants, in particular chopped corn plants.

Figure 1:
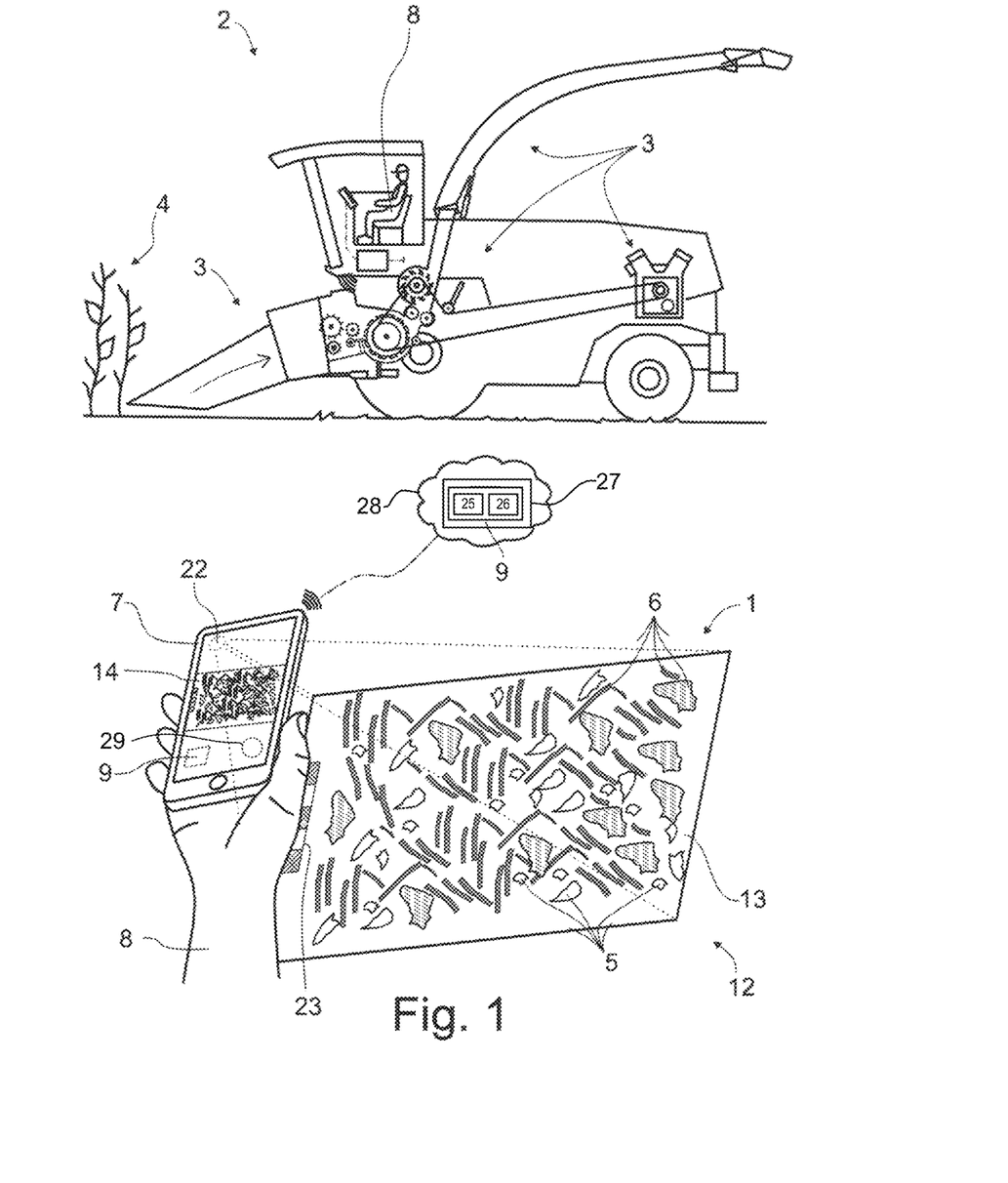
FIG. 1 illustrates a forage harvester and a mobile device in a situation using the proposed method.

The forage harvester 2 shown in FIG. 1 has at least one work assembly 3 for harvesting a crop 4 and/or for processing agricultural harvested material 1 of the crop 4. In this case, the crop 4 is corn plants. Other plants are contemplated.

In principle, the forage harvester 2 is configured to harvest the crop 4. Alternatively, the forage harvester 2 may also only pick up a crop 4 that has already been harvested. The crop 4 obtained in this manner may then processed by the forage harvester 2, such as chopped up. Of course, the agricultural harvested material 1 may comprise grain components 5 and non-grain components 6. The grain components 5 may be corn grains from the corn plants. The non-grain components 6 may then be leaves, stems and the like from the corn plant.

In particular, the disclosed methodology relates to a system and a method for determining an indicator I of processing quality of an agricultural harvested material 1 using a mobile device 7.

The mobile device 7 may, for example, be a smartphone or a tablet. In this regard, a user 8 may carry the mobile device 7 for easy use. In one or some embodiments, the mobile device 7 is not a dedicated device, but rather may be also generally used in life situations that are not associated with an agricultural activity (e.g., have functionality separate from performing the disclosed analysis).

In this case, the mobile device 7 has a computing unit 9, and/or communicates with a computing unit 9. The computing unit 9 may hence, for example, also be a cloud-based computing unit 9. Alternatively or in addition, the computing unit 9 may, for example, be part of the smartphone.

In one or some embodiments, the computing unit 9 is configured to analyze in an analytical routine 11 image data 10 from a prepared sample of the agricultural harvested material 1 containing grain components 5 and non-grain components 6 to determine the indicator I of the processing quality of the agricultural harvested material 1.

The prepared sample 12 of the agricultural harvested material 1 will be further explained below. It may be a thin layer of the agricultural harvested material 1 distributed on a board 13 that may be processed with a few manipulations. The situation may be such that the user 8 briefly stops the forage harvester 2 while working a field, removes for example two handfuls of agricultural harvested material 1 from a harvested material container, distributes them on a board 13 that is carried along, records an image 14 with his smartphone, and has the smartphone analyze it. The entire process may be completed in a few minutes. The user 8 may then perform direct changes to the forage harvester 2 if desired.

Further, the computing unit 9 may use a trained machine learning model 15 in the analytical routine 11 to perform at least one step of determining the indicator I of the processing quality of the agricultural harvested material 1. The trained machine learning model 15 may, for example, be a trained neural network. Various embodiments are discussed below. One advantage of the disclosed method is that the prepared sample 12 of the agricultural harvested material 1 does not have to be separated into grain components 5 and non-grain components 6.

In one or some embodiments, the grain components 5 are corn grain components. In addition or alternatively, the indicator I of the processing quality may be an indicator I of the processing quality of the grain components 5. In one or some embodiments, the indicator I of the processing quality is an indicator I of the corn cracking that may correspond with the corn silage processing score. The disclosed method may therefore serve to approximate the CSPS.

Figure 2:
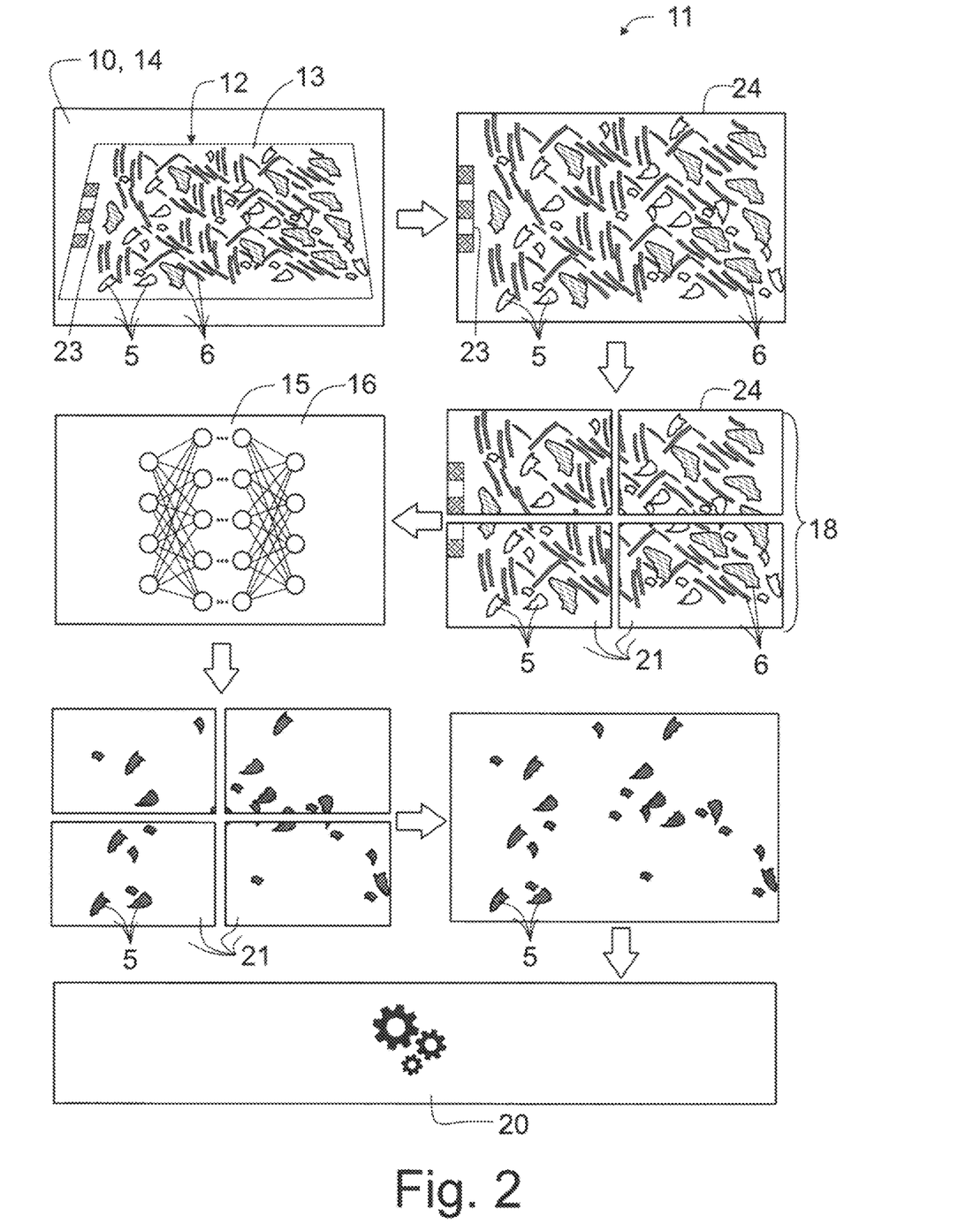
FIG. 2 schematically illustrates the steps of the proposed method.
Figure 3:
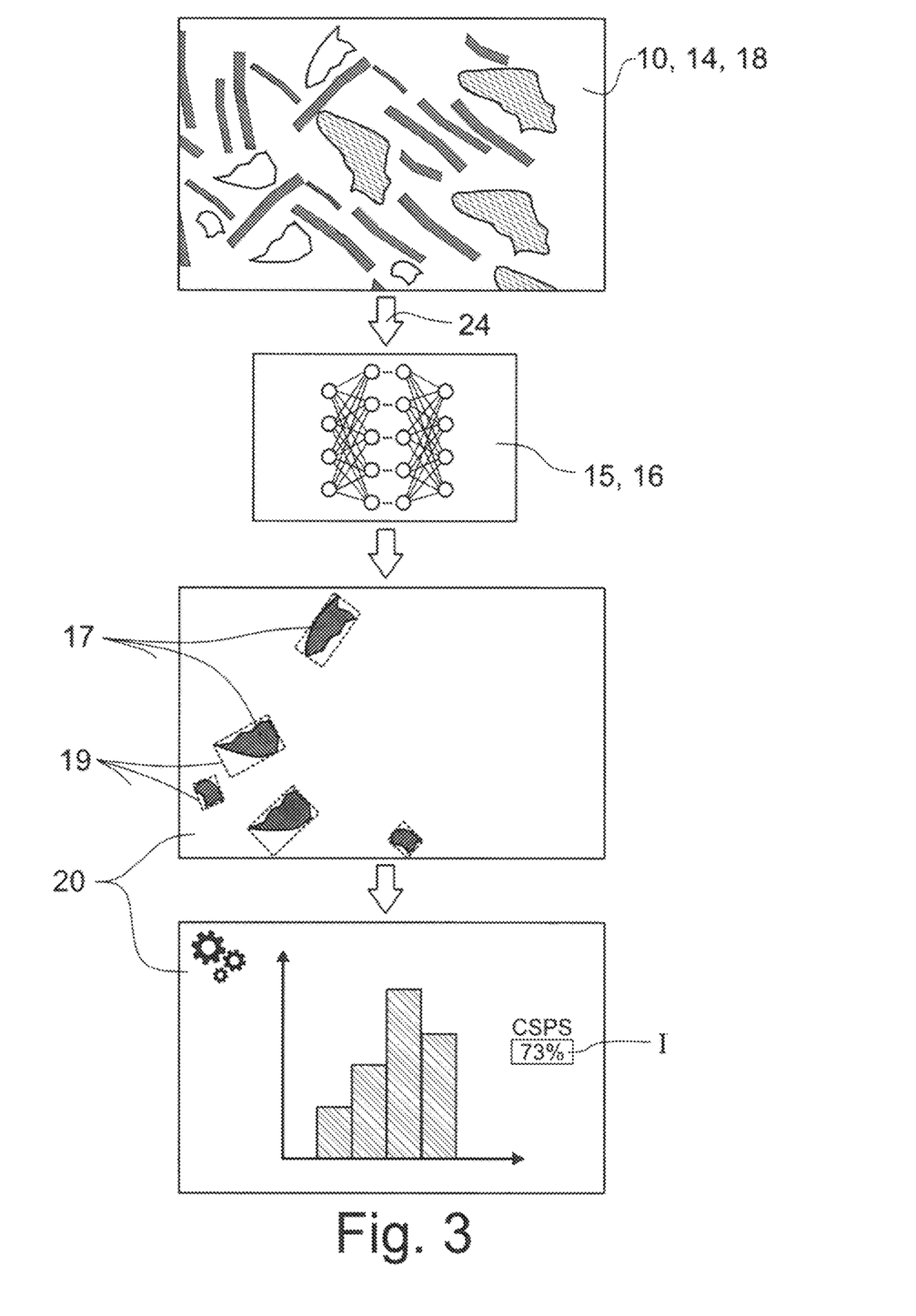
FIG. 3 schematically illustrates one example of the disclosed analytical routine.

The analytical routine 11 will now be considered with reference to FIGS. 2 and 3. In one or some embodiments, the computing unit 9 may perform a classification step 16 of the image data 10 in the analytical routine 11. In the classification step 16, the computing unit 9 determines the image region(s) 17 assigned to the grain components 5 from input data 18. In the simplest case, the input data 18 may be the image data 10 itself, and generally based on the image data 10. Alternatively, the input data 18 may be determined from the image data 10 in a preprocessing step 24 discussed further below.

In one or some embodiments, the image regions 17 may be individual pixels, pixel groups, rectangles 19, polygons, etc.

In one or some embodiments, in the classification step 16, the computing unit 9 uses the trained machine learning model 15 in order to determine the image region(s) 17 assigned to the grain components 5 from the image data 10. The division of the analytical routine 11 into the classification step 16 and an analytical step 20 yet to be explained is visualized in FIG. 3.

In one or some embodiments, the trained machine learning model 15 performs a semantic segmentation of the image data 10 while being used. In semantic segmentation, pixels or pixel groups are assigned to different classes in a known manner. There is no separation of different instances of the classes. In one or some embodiments, the computing unit 9, in the classification step 16, applies the trained machine learning model 15 to the image data 10 and assigns a class to pixels, such as all pixels, of the image data 10. In one or some embodiments, one of the classes is assigned to the grain components 5.

In one or some embodiments, the machine learning model 15 assigns the pixels to at most 30 different classes, at most eight different classes, precisely three different classes, or precisely two different classes. In one or some embodiments, a class is assigned to non-grain components 6 of the agricultural harvested material 1, or the classes are "grain components" and "background". The last mentioned option is shown in FIG. 3, which shows an example in an image 14 of semantic segmentation into the classes "grain components" and "background". In one or some embodiments, after semantic segmentation, only information is available about which pixels are assigned to grain components 5.

From the pixels that are assigned to the grain components 5, the computing unit 9 may determine the image regions 17 assigned to the grain components 5, or the pixels assigned to the grain components 5 may be the image regions 17 assigned to the grain components 5.

The use of semantic segmentation, such as with few different classes, makes it possible to use an efficient and not very complex machine learning model 15. This may increase accuracy and may enable an application that is not very computationally-intensive, so that the computing may be performed on the mobile device 7.

After the classification step 16, an analytical step 20 may be provided as shown in FIG. 3. In one or some embodiments, the computing unit 9 executes an analytical step 20 in the analytical routine 11 for the image regions 17 assigned to the grain components 5. In the analytical step 20, the computing unit 9 determines at least one geometric property, such as a size, of the image region 17. From the geometric properties, the computing unit 9 determines the indicator I of the processing quality.

During harvesting, a user 8 may use the disclosed method in order to obtain an overview of the effectiveness of the set machine parameters of the forage harvester 2 and adjust them if necessary. For example, responsive to determining the indicator I of the processing quality, one or more machine parameters of the forage harvester 2, which affect the processing quality, may be modified. In comparison to known laboratory methods such as determining the CSPS in a laboratory, the machine parameter(s) may be changed via manual and/or automatic input for ongoing operation of the forage harvester with little expended time.

In one or some embodiments, the geometric properties may include geometric dimensions of the grain components 5. The geometric dimensions may include any one, any combination, or all of: a shortest side length; a greatest side length; or a cross-sectional area. Accordingly, in one or some embodiments, grain components 5 with at most a certain maximum shortest side length are considered comminuted and are included in the indicator of the processing quality.

The indicator of the processing quality may depict a percentage of grain components 5 with predetermined geometric properties of the agricultural harvested material 1 or the grain components 5.

In one or some embodiments, the image regions 17 are rectangles 19, or the computing unit 9 determines rectangles 19 from the image regions 17. In one or some embodiments, the rectangles 19 are minimum surrounding rectangles. In this case, a minimum surrounding rectangle comprises the smallest rectangle in any two-dimensional orientation that completely encloses the recognized pixels of the particular grain component 5. In this case, the geometric property, such as the size, may refer to one aspect of the rectangles 19. In one or some embodiments, the geometric property, such as the size, may always be a length of a smallest main axis of the rectangles 19.

It is typically the case that the grain components 5 are relatively widely distributed and rare relative to the image data 10. After the associated image regions 17 are determined in the classification step 16, the remaining analysis in the analytical step 20 may therefore be relatively straight-forward. Thus, in one or some embodiments, the analytical step 20 need not be based on a machine learning method. For example, in the analytical step 20, the computing unit 9 may perform edge recognition to separate the pixels assigned to the classes of "grain components" and "background" and may thereby determine the rectangles 19.

In one or some embodiments, the computing unit 9 may determine the indicator I of the processing quality in the analytical step 20 as the sum of the area of the grain components 5 with a size, such as the length of the smallest main axis of the rectangles 19, below a threshold as the portion of the overall area of the grain components 5. In one or some embodiments, the threshold may be between 3 mm and 6 mm, such as between 4 mm and 5 mm, and such as about 4.75 mm. In addition, an offset correction and/or scaling as multiplication with a factor may be provided. Accordingly, the known CSPS may be replicated as much as possible, wherein systematic deviations may be taken into account by the offset correction and/or the scaling. These may be experimentally determined.

In one or some embodiments, the trained machine learning model 15 has instructions for use and a training data set. In general, a trained machine learning model 15 may comprise a machine learning model 15 that has already been trained for the application in a training method and, in the simplest case, does not learn during use. The trained machine learning model 15 has a training data set, such as weights of the neural links, and instructions for use. The instructions for use may generally describe the computing operations to be used, and the training data set comprises the parameters of the machine learning model 15 determined in the training method, such as the weights and potentially learned hyperparameters.

With regard to the training data set and the training method, reference is made to the statements made below, and in particular the statements on the further teaching of the training procedure.

In one or some embodiments, the instructions for use are based on a convolutional neural network, such as a fully convolutional neural network. The training data set may have been determined or be determined in a training method.

As previously mentioned, the preprocessing step 24 shown in greater detail in FIG. 2 may be performed by the computing unit 9 in the analytical routine 11 to determine the input data 18 from the image data 10. The preprocessing step 24 may include any one, any combination, or all of: rotating an image 14; correcting a perspective of an image 14; dividing an image 14 (e.g., dividing the image into at least two subimages 21, into at least four subimages, subimages 21, etc.); adapting the color of an image 14; or adapting contrast of an image 14. After using the trained machine learning model 15, the subimages 21 may be joined.

Since in the present case a geometric property of individual grain fragments is sought, there is little to no relevant information in a more global context of an image 14. By dividing the image 14 into several subimages 21, a smaller neural network may therefore be used which decreases the computing complexity of the application. In particular the correction of the perspective makes it possible for the user 8, when recording the image 14, to not have to pay particular attention to recording the image 14 from a given perspective. Determining the geometric properties and using a specific, trained machine learning model 15, such as only for semantic segmentation, is made easier by correcting the perspective.

In particular, the computing unit 9 may have comprise one or more computing units 9 and may reside in one or more electronic devices. In one or some embodiments, the computing unit 9 resides in one or both a mobile device computing unit (computing unit 9 in mobile device 7) and a server computing unit (computing unit 9 in server 27). As shown, server 27 (which may reside in a cloud computing environment 28 and may comprise an example of an external electronic device to mobile device 7) may communicate wired and/or wirelessly with mobile device 7 (e.g., mobile device 7 may include communication interface 29 in which to wirelessly communication with server 27).

The computing unit 9 may comprise any type of computing functionality, such as at least one processor 25 (which may comprise a microprocessor, controller, PLA, or the like) and at least one memory 26. The memory 26 may comprise any type of storage device (e.g., any type of memory). Though the processor 25 and memory 26 are depicted as separate elements, they may be part of a single machine, which includes a microprocessor (or other type of controller) and a memory. Alternatively, processor 25 may rely on memory 26 for all of its memory needs.

The processor 25 and memory 26 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. As discussed in detail below, computing unit 9, using software (e.g., computer executable instructions for executing the analytical routine) and/or hardware, is configured to perform the functions described herein. Further, memory 26 (resident on one or both of mobile device 7 or server 27) may comprise a storage medium with a training data set saved thereon generated using the training method disclosed herein.

Thus, in one or some embodiments, the server computing unit at least partially performs the analytical routine 11. Alternatively, the computing unit 9 may only reside in the mobile device computing unit resident in the mobile device 7, and the mobile device computing unit completely performs the analytical routine 11. In a first alternative, by using a cloud, more computing power may be provided, for example, whereas in the second alternative, the analytical routine 11 is potentially concluded faster, and potentially may be performed entirely off-line and even when the Internet connection is poor.

In one or some embodiments, the image data 10 comprises several images 14. These several images 14 may be images 14 of different prepared samples. A typical laboratory sample frequently comprises 500 g of agricultural harvested material 1. In one image 14, only a much smaller amount of agricultural harvested material 1 may be depicted with manageable effort. When determining the indicator I of the processing quality, it is therefore advantageous for statistical certainty if the image data 10 have at least 100 grain particles, such as at least 150 grain particles, or at least 200 grain particles. In this case, the mobile device 7 may output a warning to the user 8 if the mobile device 7 detects too few grain particles in the image data 10. The limit may comprise less than 200 grain particles, less than 150 grain particles, or less than 100 grain particles. In one or some embodiments, the limit lies within a range above 50 grain particles (e.g., greater than 50 but less than 200 grain particles), at which a warning may be sent to the user 8 (e.g., output via the display of the mobile device 7). In response to the warning, the user 8 may be given the option of adding additional images 14 to the image data 10.

In general, the mobile device 7 may have a camera 22, and the user 8 records one or more images 14 of the image data 10 using the camera 22. In one or some embodiments, the image data 10 generally include images 14 recorded within the visible light range as are produced by commercially available smartphones. In particular, the image data 10 of the images 14 only include images 14 that were recorded in the visible range.

In one or some embodiments, the user 8 records several images 14 of different prepared samples that the computing unit 9 analyzes together as image data 10 in the analytical routine 11. In one or some embodiments, the geometric properties of the image regions 17 that are assigned to the grain components 5 are used from several images 14 in a statistical analysis to determine the indicator I of the processing quality.

The prepared sample 12 may be a sample on a defined background. This defined background may, for example, be a board 13 belonging to the forage harvester 2. The defined background, in particular the board 13, may have a size reference 23 and/or a defined color. In one or some embodiments, the situation is such that the computing unit 9 determines the geometric property, such as the size, based on the size reference 23. The color may be a color that does not occur in the agricultural harvested material 1, such as a blue tone. The board 13 may, for example, have side lengths of 10 to 50 cm.

Generally speaking, the indicator I of the processing quality may, in addition or alternatively, relate to the amount of non-grain components 6 of excessive length. An excess length is a length of a particle that lies above a given threshold value. The threshold value may depend on the machine parameters of the forage harvester 2. Excessively long particles may cause air bubbles and the formation of mold or mildew in silage.

In one or some embodiments, the mobile device 7 shows the user 8 the indicator I of the processing quality.

According to another teaching which is independently relevant, a training method is disclosed to generate a training data set of a machine learning model using a computing unit for use in the disclosed method. The computing unit generates the training data set in a training step using training instructions based on training data. The training data may comprise annotated images of prepared samples. The computing unit may use a cost function in the training instructions. Such training steps are known to those of skill in the art.

As discussed above, various computing units are contemplated. For example, the computing unit may comprise a GPU and need not comprise the computing unit of the mobile device 7. The training method may also be executed at a different time from the disclosed method of determining the indicator I of the processing quality. In one or some embodiments, a training data set is used in many applications of the disclosed method.

The use of a cost function in training a machine learning model 15 is known to those of skill in the art. The cost function may determine how the trainable parameters of the machine learning model 15 are adapted in training. The selection of a good cost function frequently contributes significantly to the success of training.

In one or some embodiments, the cost function comprises a dice loss function. In addition or alternatively, the cost function may take into consideration a deviation of the indicator I of the processing quality from a reference indicator I of the processing quality.

Normal cost functions frequently consider the absolute number of hits of the machine learning model 15. Since, however in the present case, a few pixels assigned to the grain components 5 are on many background pixels, a machine learning model 15 that classifies all pixels as background would also generate relatively low costs in a routine cost function. To counteract this, a dice loss cost function may, for example, be advantageous.

In the present case, the situation may be such that it is unimportant to correctly assign each pixel of a grain component 5; instead, the machine learning model 15 may be trained to generally approach the CSPS. When a few edge pixels of a grain component 5 are not taken into account, this effect may be negligible. It may therefore be provided that the cost function is based on calculating the indicator I of the processing quality during training using the current training status, and comparing it with a reference indicator of the processing quality from the training data. This may allow the optimum result of training to be very close to the CSPS instead of optimizing for a possibly unattainable perfection of semantic segmentation.

It may therefore be provided that a deviation of the indicator I of the processing quality is calculated using a current training state of a reference indicator of the processing quality. This deviation may be included in the cost function. In particular, it may be advantageous to use a callback to regularly consider the deviation in the cost function.

As previously explained, a machine learning model 15 that is not overly complex may be used in the present case. In one or some embodiments, the machine learning model 15 includes at least 4 million trainable parameters, at least 5 million trainable parameters, at least 6 million trainable parameters, at most 15 million trainable parameters, at most 12 million trainable parameters, or at most 9 million trainable parameters. For example, an Efficientnetb1 based on Tensorflow or Tensorflow light has proven to be very useful. In one or some embodiments, UNET may be used as the architecture.

In one or some embodiments, the indicator I of the processing quality and/or a statistical certainty of the indicator of the processing quality I, such as an amount of detected grain particles, is shown to a user 8 (e.g., via a display resident on the mobile device 7). In one or some embodiments, the user 8 may also be shown a statistical certainty of the indicator of the processing quality I that may be determined from the image data 10. An amount of detected grain particles may easily be used to do this. If this amount is below a given limit value, it may be recommended to the user 8 to record an additional image 14.

In one or some embodiments, reference is made to all embodiments of the disclosed method for the training method, and to all embodiments of the training method for the disclosed method.

According to another teaching which is also independently relevant, a storage medium is disclosed with a training data set saved thereupon that is generated using a disclosed training method for use in the disclosed method. Reference is made to all statements regarding the disclosed training method and the disclosed method.

According to another teaching which is also independently relevant, a computing unit 9 configured to perform the analytical step 20 and/or the analytical routine 11, and or the disclosed training method is disclosed. Reference is made to all statements regarding the disclosed method and the disclosed training method.

According to another teaching which is independently relevant, a mobile device 7 configured for use in the disclosed method is disclosed. Reference is made to all statements regarding the disclosed method.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Harvested material
2 Forage harvester
3 Work assembly
4 Crop
5 Grain components
6 Non-grain components
7 Mobile device
8 User
9 Computing unit
10 Image data
11 Analytical routine
12 Sample
13 Board
14 Image
15 Trained machine learning model
16 Classification step
17 Image regions
18 Input data
19 Rectangles
20 Analytical step
21 Subimages
22 Camera
23 Size reference
24 Preprocessing step
25 Processor
26 Memory
27 Server
28 Cloud computing environment
29 Communication interface
I Indicator

The invention claimed is:

1. A method for determining, using a mobile device, an indicator of processing quality of an agricultural harvested material generated by an agricultural harvesting machine, the method comprising:
performing harvesting using the agricultural harvesting machine in order to generate the agricultural harvesting material;
after performing harvesting using the agricultural harvesting machine, removing, by a user, the agricultural harvesting material from a container of the agricultural harvesting machine;
placing, by the user, one or more harvesting material samples from the agricultural harvesting material that is removed from the container onto a defined background, wherein the defined background has a size reference, wherein the one or more harvesting material samples are placed on the defined background without the user separating the one or more harvesting material samples into grain components and non-grain components;
obtaining, using a camera resident on the mobile device, one or more images of the one or more harvesting material samples;
analyzing, by a computing unit of one or both of the mobile device or a device in communication with the mobile device using an analytical routine, image data from the one or more images of the one or more harvesting material samples containing grain components and non-grain components in order to determine the indicator of the processing quality of the agricultural harvested material, wherein the analytical routine includes a trained machine learning model, wherein the analytical routine uses the size reference in the defined background in order to determine size of at least a part of the one or more harvesting material samples, and wherein the analytical routine uses the size and the trained machine learning model to determine the indicator of the processing quality of the agricultural harvested material;
outputting the indicator on a display of the mobile device;
changing, based on the indicator, one or more machine parameters on the agricultural harvesting machine; and
resuming harvesting using the agricultural harvesting machine with the one or more machine parameters that are changed.

2. The method of claim 1, wherein the grain components comprise corn grain components; and
wherein the indicator of the processing quality comprises an indicator of the processing quality of the grain components correlates to a corn silage processing score.

3. The method of claim 1, wherein the computing unit performs a classification step of the image data in the analytical routine;
wherein, in the classification step, the computing unit uses the trained machine learning model in order to determine one or more image regions assigned to the grain components from input data based on the image data;
wherein the trained machine learning model performs a semantic segmentation of the image data;
wherein the computing unit, in the classification step, applies the trained machine learning model to the image data and assigns a class selected from a plurality of potential classes to some or all pixels of the image data;
wherein the plurality of potential classes comprises grain components and non-grain components;
wherein the computing unit executes an analytical step in the analytical routine for the one or more image regions assigned to the grain components;
wherein, in the analytical step, the computing unit determines at least one geometric property of the one or more image region assigned to the grain components;
wherein the computing unit determines the indicator of the processing quality from the at least one geometric property;
wherein the at least one geometric property comprises a size;
wherein the computing unit determines within the image data one or more rectangles; and
wherein the computing unit determines the indicator of the processing quality based on the size of at least one aspect of the one or more rectangles.

4. The method of claim 3, wherein the one or more rectangles comprise one or more minimum surrounding rectangles;
wherein the size comprises a length of a smallest main axis of the one or more minimum surrounding rectangles; and wherein the computing unit determines the indicator of the processing quality based on the length of the smallest main axis of the one or more minimum surrounding rectangles.

5. The method of claim 3, wherein analyzing using the analytical routine the image data from the one or more harvesting material samples of the agricultural harvested material containing the grain components and the non-grain components is not based on a machine learning method;
   wherein in the analytical step, the computing unit performs edge recognition to separate the pixels assigned to the classes of grain components and background, thereby determining the rectangles;
   wherein the size comprises a length of a smallest main axis of the one or more rectangles;
   wherein the computing unit determines the indicator of the processing quality in the analytical step as a sum of an area of the grain components with a length of the smallest main axis of the one or more rectangles, below a threshold as a portion of an overall area of the grain components; and
   wherein the threshold is between 3 mm and 6 mm.

6. The method of claim 1, wherein the trained machine learning model has instructions for use and a training data set;
   wherein the instructions for use are based on a convolutional neural network, in particular a fully convolution neural network; and
   wherein the training data set has been or is determined in a training method;
   wherein, in the analytical routine, the computing unit performs a preprocessing step in order to determine input data from the image data;
   wherein the preprocessing step includes one or more of: rotating an image; correcting a perspective of the image; dividing the image into a plurality of subimages; adapting color of the image; or adapting contrast of the image.

7. The method of claim 1, further comprising:
   generating a training data set for training a machine learning model, wherein the computing unit generates the training data set in a training step using training instructions based on training data;
   wherein the training data comprise one or both of annotated image data of prepared samples;
   wherein the computing unit uses a cost function in the training instructions;
   wherein the cost function takes into consideration a deviation of the indicator of the processing quality from a reference indicator of the processing quality; and
   wherein the deviation of the indicator of the processing quality is calculated using a current training state of a reference indicator of the processing quality, and is taken into account in the cost function by using a callback.

8. A mobile device comprising:
   a display;
   a camera, wherein the camera is configured to obtain one or more images of one or more harvesting material samples placed on a defined background, wherein the defined background has a size reference, wherein the one or more harvesting material samples are placed on the defined background without a user separating the one or more harvesting material samples into grain components and non-grain components; wherein the one or more harvesting material samples are from agricultural harvesting material that is removed by the user from a container, the agricultural harvesting material being generated by performing harvesting using an agricultural harvesting machine;
   a communication interface configured to communicate with an external electronic device; and
   a computing unit in communication with the display, the camera, and the communication interface and configured to:
      analyze, using an analytical routine, image data from the one or more images of the one or more harvesting material samples containing grain components and non-grain components in order to determine an indicator of processing quality of the agricultural harvested material, wherein the analytical routine includes a trained machine learning model, wherein the analytical routine uses the size reference in the defined background in order to determine size of at least a part of the one or more harvesting material samples, and wherein the analytical routine uses the size and the trained machine learning model to determine the indicator of the processing quality of the agricultural harvested material; and
      output the indicator on a display of the mobile device for changing, based on the indicator, one or more machine parameters on the agricultural harvesting machine and for resuming harvesting using the agricultural harvesting machine with the one or more machine parameters that are changed.

9. The mobile device of claim 8, wherein the computing unit is configured to perform a classification step of the image data in the analytical routine;
   wherein, in the classification step, the computing unit is configured to use the trained machine learning model in order to determine one or more image regions assigned to the grain components from input data based on the image data;
   wherein the trained machine learning model is configured to perform a semantic segmentation of the image data;
   wherein the computing unit, in the classification step, is configured to apply the trained machine learning model to the image data and to assign a class selected from a plurality of potential classes to some or all pixels of the image data; and
   wherein the plurality of potential classes comprises grain components and non-grain components.

10. The method of claim 1, wherein the size reference is positioned only on a part of the defined background such that the user places the one or more harvesting material samples only on a different part of the defined background.

11. The method of claim 1, further comprising after operating the agricultural harvesting machine in order to generate the agricultural harvesting material, stopping the agricultural harvesting machine; and
   after stopping the agricultural harvesting machine, removing the agricultural harvesting material from a container of the agricultural harvesting machine.

12. The method of claim 11, wherein an operator performs the harvesting in a field using the agricultural harvesting machine;
   wherein the operator stops the agricultural harvesting machine in the field;
   wherein the operator obtains the one or more images in the field;
   wherein the operator, responsive to seeing the indicator on the display of the mobile device, changes the one or more machine parameters on the agricultural harvesting machine as the agricultural harvesting machine is in the field; and wherein the operator resumes harvesting in the field using the agricultural harvesting machine.

13. The method of claim 1, further comprising transmitting the one or more images from the mobile device to a server;

wherein the server analyzes the one or more images in order to determine the indicator of the processing quality; and further comprising transmitting the indicator of the processing quality from the server to the mobile device for output on the display of the mobile device.

14. The method of claim 13, wherein the one or more harvesting material samples comprises different prepared samples;

wherein for each respective prepared sample of the different prepared samples: placing the respective prepared sample on the defined background and obtaining a respective image of the respective prepared sample; and wherein each of the respective images are analyzed by the server in order to determine the indicator of the processing quality of the agricultural harvested material.

15. The method of claim 1, further comprising:

determining, based on analysis of the grain components in the one or more images, whether the one or more harvesting material samples are sufficient for determining the indicator of the processing quality of the agricultural harvested material.

16. The method of claim 15, wherein determining whether the one or more harvesting material samples are sufficient is based on a number of grain particles determined from the image data.

17. The method of claim 15, further comprising, responsive to determining that the number of the grain particles determined from the image data is less than a predetermined number, further comprising:

outputting to the mobile device a warning indicating insufficiency; and receiving one or more additional images of the one or more harvesting material samples.

18. The method of claim 17, wherein the warning indicating insufficiency comprises a warning that that too few grain particles are detected in the image data.

19. The mobile device of claim 8, wherein the computing unit is further configured to:

determine, based on analysis of the grain components in the one or more images, whether the one or more harvesting material samples are sufficient for determining the indicator of the processing quality of the agricultural harvested material.

20. The mobile device of claim 19, wherein, responsive to the computing unit determining that the number of the grain particles determined from the image data is less than a predetermined number, the computing unit is further configured to:

output a warning indicating insufficiency; and receive, via the camera, one or more additional images of the one or more harvesting material samples.

* * * * *